United States Patent
Klemen et al.

(10) Patent No.: US 7,278,942 B2
(45) Date of Patent: Oct. 9, 2007

(54) TRANSMISSION PACKAGING AND ROTOR SUPPORT STRUCTURE

(75) Inventors: Donald Klemen, Carmel, IN (US); Boris I. Burgman, Oak Park, MI (US); Richard A. Pashnik, Saline, MI (US); John A. Diemer, Farmington Hills, MI (US)

(73) Assignees: General Motors Corporation, Detroit, MI (US); DaimlerChrysler AG, Stuttgart (DE); DaimlerChrysler Corporation, Auburn Hills, MI (US)

( * ) Notice: Subject to any disclaimer, the term of this patent is extended or adjusted under 35 U.S.C. 154(b) by 182 days.

(21) Appl. No.: 11/158,896

(22) Filed: Jun. 22, 2005

(65) Prior Publication Data

US 2006/0037428 A1    Feb. 23, 2006

Related U.S. Application Data

(60) Provisional application No. 60/602,983, filed on Aug. 19, 2004.

(51) Int. Cl.
  *F16H 3/72* (2006.01)
(52) U.S. Cl. ........................................ 475/35
(58) Field of Classification Search .......... 475/5; 477/3; 180/65–7
  See application file for complete search history.

(56) References Cited

U.S. PATENT DOCUMENTS

| 5,931,757 | A | * | 8/1999 | Schmidt | 475/2 |
| 5,935,035 | A | * | 8/1999 | Schmidt | 475/5 |
| 6,358,173 | B1 | * | 3/2002 | Klemen et al. | 475/5 |
| 6,863,140 | B2 | * | 3/2005 | Noreikat et al. | 180/65.2 |
| 7,029,412 | B2 | * | 4/2006 | Majalahti | 475/5 |
| 2002/0077209 | A1 | | 6/2002 | El-Antably et al. | |

FOREIGN PATENT DOCUMENTS

| DE | 19948224 | 6/2001 |
| DE | 19942445 | 5/2003 |
| DE | 10160466 | 6/2003 |
| DE | 10154147 | 7/2003 |
| DE | 10314195 | 11/2003 |
| DE | 10246839 | 4/2004 |
| DE | 10251042 | 5/2004 |
| EP | 0980994 | 8/1999 |
| EP | 1145893 | 10/2000 |
| WO | WO03/106207 | 12/2003 |

\* cited by examiner

*Primary Examiner*—Dirk Wright

(57) ABSTRACT

A support structure for a rotor within a transmission system is provided. The cantilevered support structure is umbrella-shaped to create an area of space between the rotor and the main shaft where other vehicle components, such as a gear set or system of clutches, may be packaged. The cantilevered support structure may be a true cantilever or a steady-rested cantilever. The support structure maintains the rotor at a distance from the transmission main shaft to maintain torque within the system while compacting packaging requirements. A second cantilevered support structure is wineglass-shaped to create a second area of packaging space between the rotor and the main shaft. The support structures may be telescoped to further compact the transmission.

11 Claims, 3 Drawing Sheets

TRANSMISSION PACKAGING AND ROTOR SUPPORT STRUCTURE

CROSS REFERENCE TO RELATED APPLICATIONS

This Application claims the benefit of U.S. Provisional Application No. 60/602,983, filed Aug. 19, 2004, which is hereby incorporated by reference in its entirety.

TECHNICAL FIELD

This invention relates to a support system for a rotor in a vehicle transmission system.

BACKGROUND OF THE INVENTION

An electrically-variable vehicle transmission typically includes a motor/generator module having a rotor and stator. In previous designs the rotor and stator are supported by a support system referred to as a "can" design. The "can" design supports the stator and maintains an internal area for the rotor to rotate around the transmission center axis while supported by a rotor support structure. The "can" design surrounds or encloses the stator, rotor, and rotor support structure on all sides and, thus, may limit the range of other mechanisms or components that can reside in the space within the "can" by restricting the available space for packaging between the motor/generator module and the center axis of the transmission system.

SUMMARY OF THE INVENTION

The support structure of the present invention supports a rotor at a distance from a transmission center axis to maintain torque within a vehicle transmission system while reducing packaging requirements by increasing available space adjacent to the support structure, particularly between the transmission main shaft and the rotor. The support structure provides improved packaging while supporting the rotor in the transmission system.

The support structure is a cantilevered system, wherein "cantilevered system" includes both a true cantilever and a steady-rested cantilever. A steady-rested cantilever is a cantilevered system wherein one or more bearings lend additional support to the support structure. The support structure is connected to the rotatable main shaft such that the support structure and the connected rotor rotate therewith. The cantilevered nature of the support structure creates a packaging space radially within the rotor, adjacent to the support structure. The packaging space may be used to house vehicle components such as a gear set or a system of clutches.

The support structure of the present invention is adapted to support a rotor in a vehicle transmission system. The support structure may have a substantially umbrella-shaped body that is rotatable about the main axis of the transmission system. The umbrella-shaped body supports the rotor at a radial distance and concentric with the center axis of the main shaft of the transmission system. By supporting the rotor at a radial distance, the umbrella-shaped body creates a packaging space between the rotor and the main shaft where transmission components may be packaged and retained.

The support structure of the present invention, which is adapted to support a rotor in a vehicle transmission system, also has a first portion adapted to connect to the transmission main shaft for rotation therewith. A second portion of the support structure is configured as an annular skirt substantially as long as the rotor. The second portion extends axially from the first portion in an unsupported cantilevered manner. The second portion is spaced sufficiently from the transmission main shaft to form an unobstructed packaging space for the length of the skirt. The packaging space is open on one axial end to provide a housing for vehicle components within the packaging space.

Accordingly, packaging space and a rotor support structure for a transmission and its other components are provided. A first embodiment includes a first structure with a shaft portion adapted to connect with an internal transmission driveshaft. The first structure also has a first skirt portion configured to circumscribe the shaft portion and support a first rotor. The first embodiment also includes a second structure having a sleeve portion configured to telescopingly receive the shaft portion of the first structure. The second structure has a second skirt portion configured to support a second rotor. The first and second skirt portions are sufficiently spaced from the axis of the mainshaft such that the installed shaft portions of the first and second structures overlap and concentrically align with the bearings, and other transmission components may be compactly packaged beneath the skirt portions. Additionally, the first structure may be substantially umbrella-shaped and the second structure may be substantially wineglass-shaped.

The present invention provides a support structure adapted to support a rotor in a vehicle transmission system having a rotatable main shaft. The support structure comprises an annular-skirted body connected with the main shaft. The annular-skirted body of the support structure maintains the rotor at a radial distance from the center axis of the transmission system. The radial distance of the annular-skirted body is sufficient to create a packaging space between the rotor and the main shaft where at least one transmission component may be packaged and retained.

The present invention provides a support arrangement adapted to support a pair of rotors in a vehicle transmission system having a rotatable main shaft. The support arrangement comprises first and second grounded support structures for respectively supporting one of the pair of rotors. Each of the first and second support structures maintains a respective radial distance from the center axis of the transmission system. Each radial distance creates a packaging space between the respective rotor and the main shaft sufficient to retain at least one respective transmission component.

The present invention provides a support structure adapted to support a rotor in a vehicle transmission system having a rotatable main shaft. The support structure includes a first portion of the support structure having a shaft portion adapted to be connected to the main shaft for rotation with the main shaft and a second portion of the support structure configured as an annular skirt. The annular skirt is substantially as long as the rotor and extends axially from the first portion in an unsupported cantilever manner spaced sufficiently from the shaft portion to form an unobstructed packaging space for the length of the annular skirt. The annular skirt is open on one axial end to house at least one transmission component within the packaging space.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
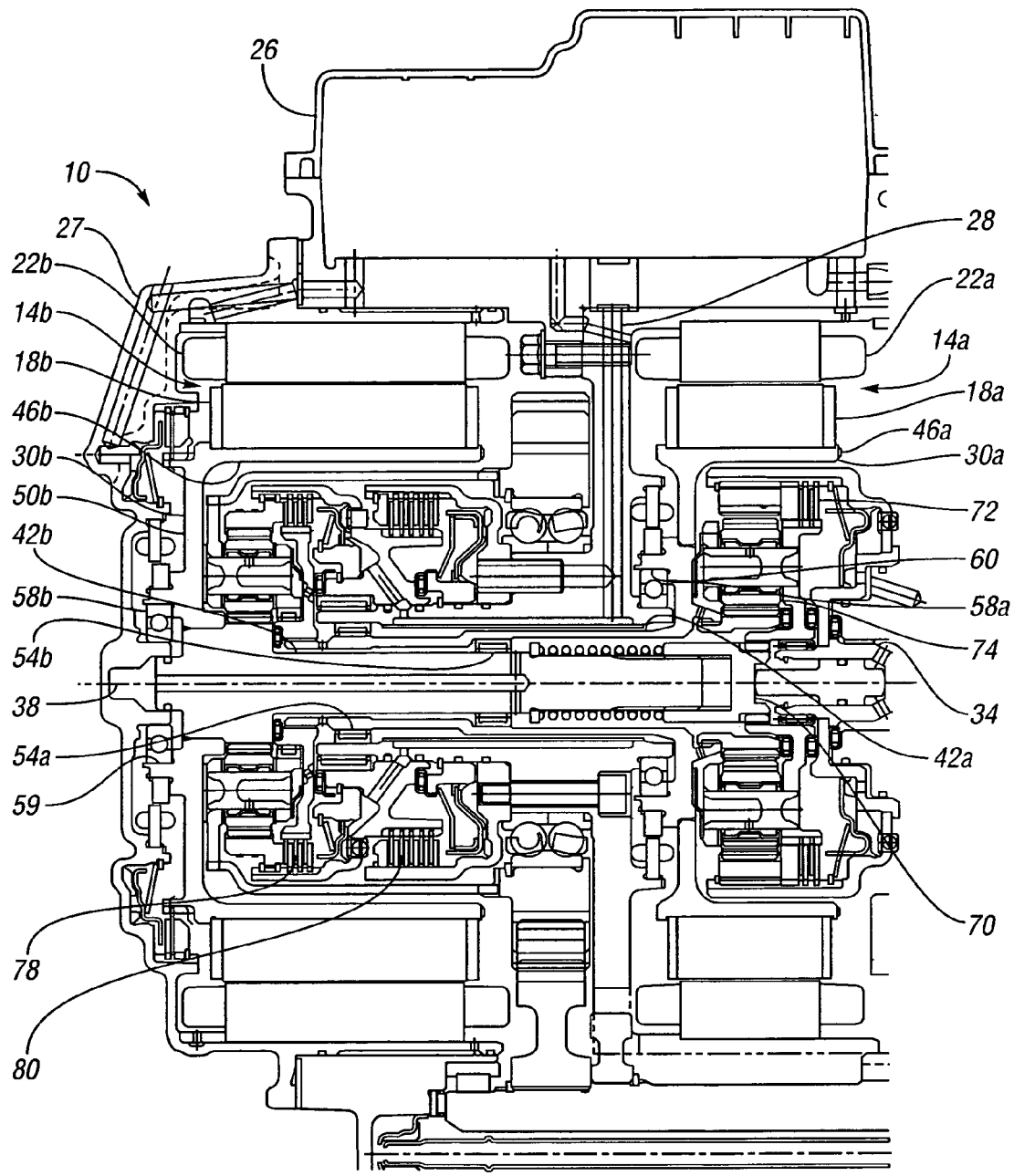
FIG. 1 is a fragmentary vertical cross-sectional view, partly in elevation, of a transmission system including the first and second support structures of the present invention.

FIG. 1 is a fragmentary vertical cross-sectional view of a vehicle transmission system 10 having two motor/generator modules 14a, 14b. Each motor/generator module 14a, 14b comprises a rotor 18a, 18b and a stator 22a, 22b. The stators 22a, 22b are connected to the transmission housing 26 and, thus, remain stationary within the transmission housing 26. The stators 22a, 22b may be connected to the transmission housing 26 either directly or indirectly, such as being connected to the end cover 27 or center support 28 which is, then, connected to the transmission housing 26. The rotors 18a, 18b are supported by support structures 30a, 30b that are connected to shafts 42a, 42b which are concentric with the main shaft 34 of the transmission system 10 and, thus, may rotate about the center axis 38. The connecting portion of support structure 30b is a center shaft portion 42b. The connecting portion of support structure 30a is a hollow shaft portion 42a configured for telescopingly nesting with the adjacent center shaft portion 42b of support structure 30b as shown in FIG. 1. This telescoping nesting provides additional alignment support for the rotors. The shaft connections of 42a, 42b may be by a spline, clutch, or gear, as required by the transmission schematic selected.

Figure 2:
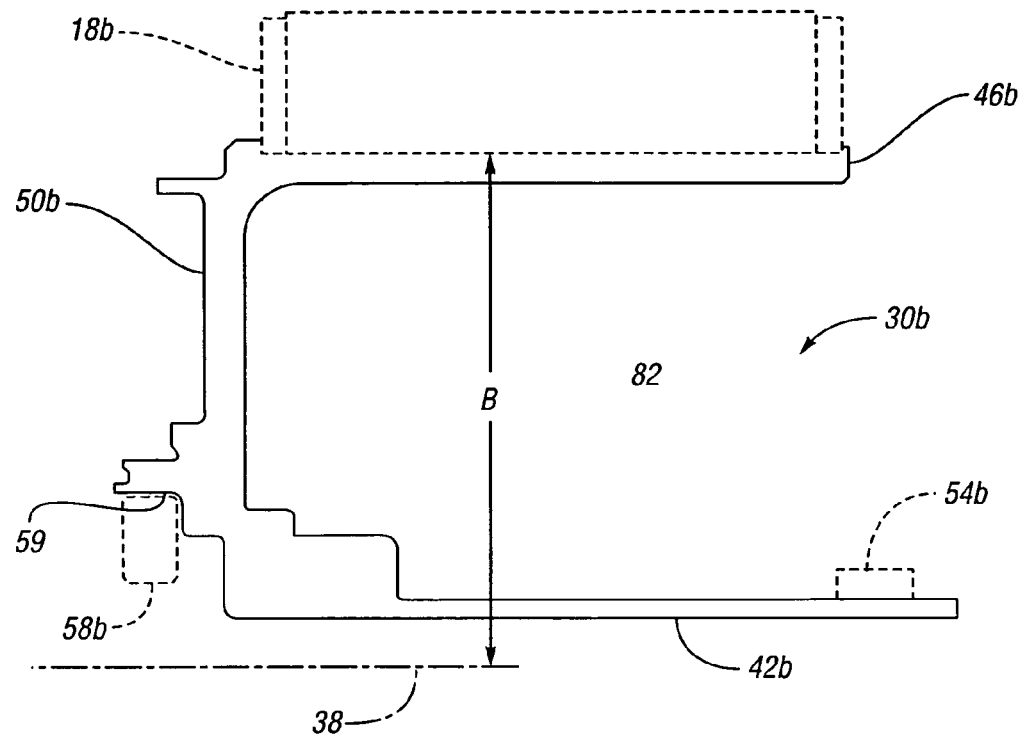
FIG. 2 is a schematic cross-sectional half-view of the first umbrella-shaped structure of the present invention.
Figure 3:
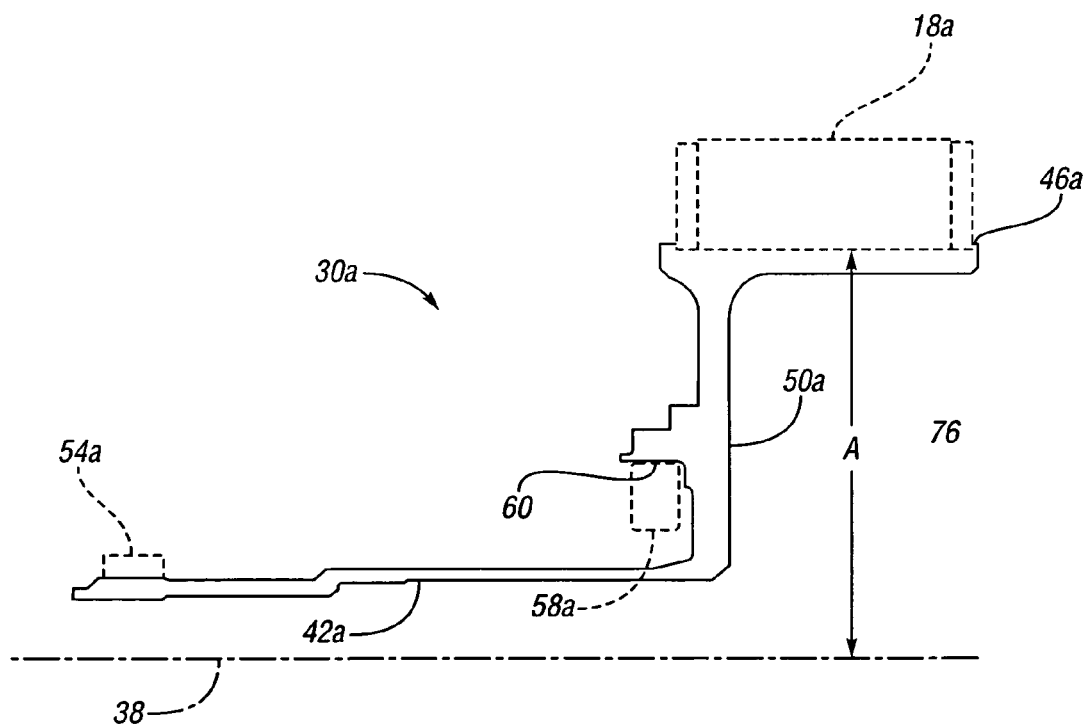
FIG. 3 is a schematic cross-sectional half-view of the second wineglass-shaped structure of the present invention.
Figure 4:
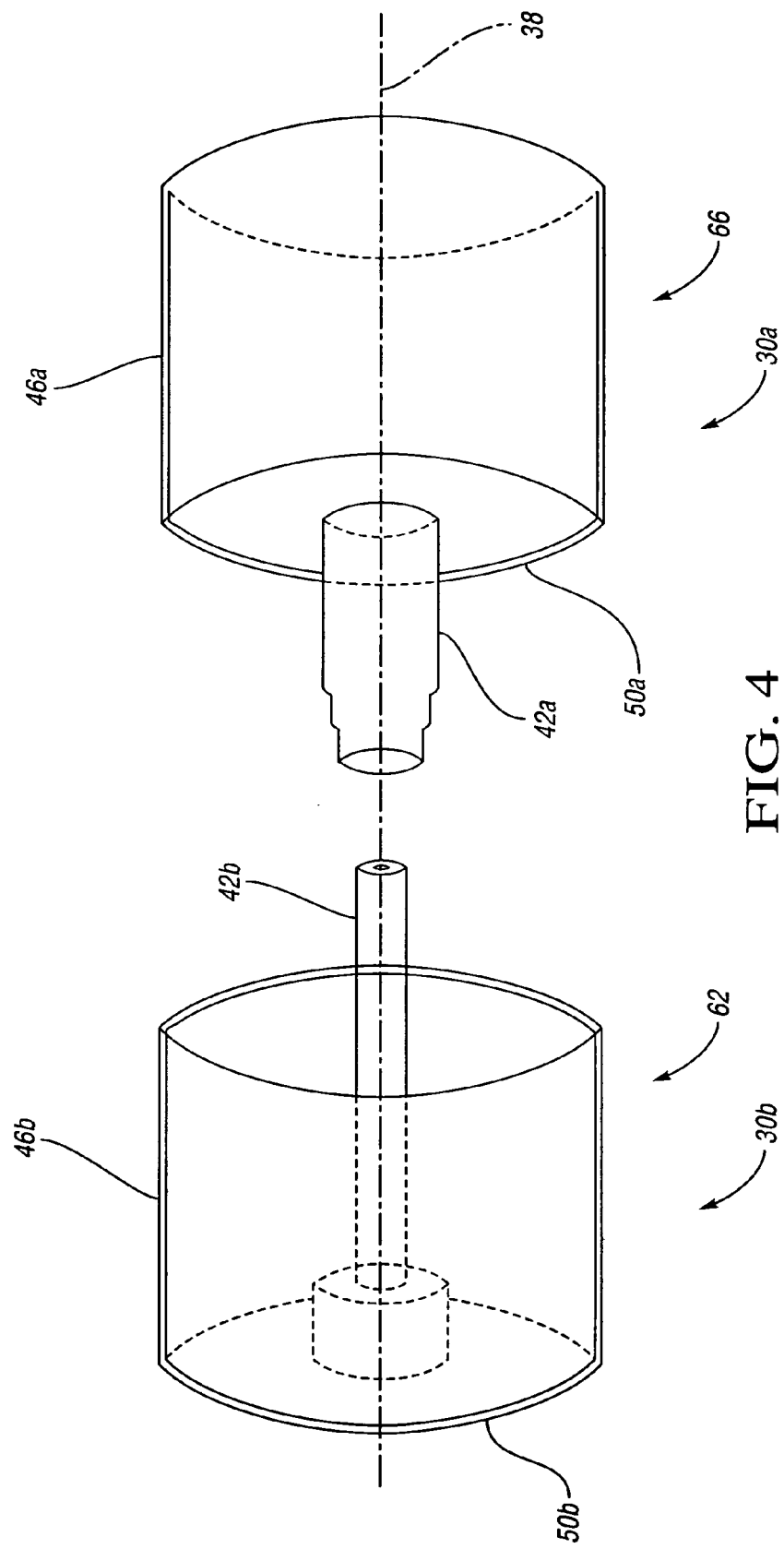
FIG. 4 is an exploded schematic perspective view with parts broken away to show both the umbrella-shaped and wineglass-shaped rotor support structures of this invention.

The support structures 30a, 30b may be true cantilevers or steady-rested cantilevers. A "true" cantilever is a structure that is supported at one end and is subject to a load along the length of the structure, such as the annular skirt portions 46a, 46b, as shown in FIGS. 2-4, of the support structures 30a and 30b. A "steady-rested" cantilever is similar to a true cantilever with at least one additional bearing for additional support. Bearings 58a, 58b provide support to the transmission housing 26, and therefore ground, providing radial positioning of structures 30a and 30b. Bearing sets 54a, 54b in FIGS. 1, 2, and 3 are steady rest bearings providing a second radial support, thereby defining a centerline of rotation of each assembly. Axial positioning is maintained with a combination of ball and thrust roller bearings as shown in FIG. 1. Other arrangements of roller and thrust or multiple ball bearings may also be substituted. Decreasing the axial distance between two or more bearings may decrease the dimensional control of the support structures 30a, 30b.

FIGS. 1 and 4 illustrate the support structures 30a, 30b in accordance with the present invention, wherein one support structure 30b (also illustrated in FIG. 2) is a substantially "umbrella-shaped" design 62 and the other support structure 30a (also illustrated in FIG. 3) is a substantially "wineglass-shaped" design 66. The terms "umbrella" and "wineglass" refer to loose approximations of the general shapes of the support structures 30a, 30b, such as shown in the perspective views of FIG. 4. FIG. 4 illustrates the shape of the support structures 30a, 30b as generated by a full rotation of the structures shown in FIGS. 2 and 3 about the center axis 38 of the transmission.

As illustrated in FIG. 2, the "umbrella-shaped" support structure 30b has a center shaft portion 42b, where the support structure 30b is attachable to the main shaft 34, as shown in FIG. 1. The main shaft 42b is engaged to at least one transmission component as described in commonly assigned co-pending U.S. Provisional Application No. 60/602,976, filed Aug. 19, 2004, entitled "Main Shaft Dog Clutch and Method," to Diemer et al., which is incorporated in its entirety herein. The functionality of the dog clutch 70 of FIG. 1 is also described in the above incorporated application. Referring back to FIGS. 1 and 2, the support structure 30b may have a first bearing 54b located along the center shaft portion 42b to lend extra support to the support structure 30b. The umbrella-shaped structure 30b also has an annular skirt portion 46b where a rotor 18b is attachable. The skirt portion 46b has a closed end portion 50b which is affixed to the center shaft portion 42b. A second bearing 58b may be located in an annular pocket 59 on the closed end portion 50b. The term "umbrella-shaped" generally refers to a support structure 30b wherein the closed end portion 50b and skirt portion 46b are situated similar to an umbrella cover on a center shaft portion 42b, which can be compared to an umbrella handle. More specifically, it refers to a support structure 30b wherein the skirt portion 46b and center shaft portion 42b rotate about the axis 38 of the main shaft 34, and the center shaft portion 42b extends axially from the closed end portion 50b within the skirt portion 46b.

As illustrated in FIGS. 3 and 4, the "wineglass-shaped" support structure 30a has a shaft portion 42a, which telescopes over the shaft portion 42b of the support structure 30b for relative rotation on bearings 54a and 58a, as shown in FIG. 1. Referring back to FIG. 3, the support structure 30a may be associated with a first bearing 54a located along the hollow shaft portion 42a, which is a telescoping stem portion, to lend extra support to the wineglass structure 30a. The wineglass shape also has an annular skirt portion 46a where a rotor 18a may attach. The skirt or bowl portion 46a is connected to the shaft or hollow shaft portion 42a, which is the wineglass stem portion, extending from the closed end or bowl bottom portion 50a of the wineglass. A second bearing 58a may be located in an annular pocket 60 on the closed end portion 50a. The term "wineglass shape" generally refers to a support structure 30a wherein the skirt or bowl portion 46a and the stem portion 42a rotate about the main axis 38 of the transmission and the stem portion 42a extends axially away from the interior of the skirt or bowl portion 46a. The shaft portion connects to at least one transmission component determined by the transmission gear arrangement.

Referring to FIGS. 1-3, both support structures 30a, 30b support a respective rotor 18a, 18b at a respective radial distance A, B from the center axis 38 of the transmission system 10. An increased respective radial distance A, B is associated with increased speed, which is calculated as the square of the respective radial distance A, B between the transmission system center axis 38 and its respective rotor 18a, 18b. Thus, the skirt portions of the support structures 30a, 30b are spaced sufficiently from the main shaft 34 when the telescoped shaft portions 42a, 42b are drivably connected with the main shaft 34 to compactly package other components of the transmission therewithin. Transmission components, such as a clutch 72 or a gear set 74, may be compactly packaged in the space 76 defined by skirt 46a and the open end of the wineglass bowl. Likewise, transmission components, such as a system of clutches 78, 80, may be compactly packaged in the space 82 defined by skirt 46b and the open end of the umbrella cover. Spaces 76, 82 may also be sufficiently unobstructed to accommodate such compact packaging of transmission components.

While the best modes for carrying out the invention have been described in detail, those familiar with the art to which this invention relates will recognize various alternative designs and embodiments for practicing the invention within the scope of the appended claims.

The invention claimed is:

1. A support structure adapted to support a rotor in a vehicle transmission system having a rotatable main shaft, said support structure comprising:
   an annular skirt portion rotatable with the main shaft, wherein said annular skirt portion includes a hollow shaft portion configured for telescopingly nesting with an adjacent support structure;
   wherein said annular skirt portion maintains the rotor at a radial distance from a center axis of the transmission system; and
   wherein said radial distance of said annular skirt portion is sufficient to create a packaging space between the rotor and the main shaft wherein at least one transmission component may be packaged.

2. The support structure of claim 1 wherein said annular skirt portion is shaped to substantially form one of an umbrella-shaped or a wineglass-shaped structure and further comprises a steady-rested cantilevered body.

3. The support structure of claim 1 wherein the packaging space is sufficiently spacious to house a system of clutches and/or gear sets.

4. A support arrangement adapted to support a pair of rotors in a vehicle transmission system having a rotatable main shaft, said support arrangement comprising:
   first and second support structures for respectively supporting one of said pair of rotors;
   wherein each of said first and second support structures is rotatable with the main shaft;
   wherein each of said first and second support structures maintains a respective rotor at a respective radial distance from a center axis of the transmission system; and
   wherein each said radial distance creates a packaging space between the respective rotor and the main shaft sufficient to retain at least one respective transmission component.

5. The support structure of claim 4 wherein each of said first and second support structures includes a shaft portion for facilitating the rotation of said support structures with the main shaft and at least partially maintaining said radial distance to create said packaging space.

6. The support structure of claim 5 wherein said shaft portions of each of said first and second support structures are sufficiently axially alignable so that said first and second support structures are compactable in said transmission system.

7. The support structure of claim 6 wherein at least one of said shaft portions is sufficiently hollow to receive the other of said shaft portions when said support structures are compacted.

8. A support structure adapted to support a rotor in a vehicle transmission system having a rotatable main shaft, said support structure comprising:
   a first portion of the support structure having a shaft portion adapted to be connected to the main shaft for rotation with the main shaft, wherein said shaft portion is telescopingly nestable with an adjacent support structure; and
   a second portion of the support structure configured as an annular skirt substantially as long as said rotor and extending axially from said first portion in an unsupported cantilever manner spaced sufficiently from the shaft portion to form an unobstructed packaging space for the length of the annular skirt which is open on one axial end thereof to house at least one transmission component within said packaging space.

9. The support structure of claim 8 wherein the support structure comprises a steady-rested cantilevered body.

10. The support structure of claim 8 wherein the packaging space is sufficiently spacious to house a system of clutches and/or gear sets.

11. The support structure of claim 8 including at least one bearing for positioning the support structure within the transmission system.

* * * * *